United States Patent
Hammer

(10) Patent No.: US 8,353,212 B2
(45) Date of Patent: Jan. 15, 2013

(54) MICROMECHANICAL RATE-OF-ROTATION SENSOR

(75) Inventor: Hanno Hammer, Graz/Lebring (AT)

(73) Assignee: Maxim Integrated Products GmbH, Planegg (DE)

( * ) Notice: Subject to any disclaimer, the term of this patent is extended or adjusted under 35 U.S.C. 154(b) by 358 days.

(21) Appl. No.: 12/671,483

(22) PCT Filed: Jul. 31, 2008

(86) PCT No.: PCT/EP2008/060086
§ 371 (c)(1),
(2), (4) Date: Jan. 29, 2010

(87) PCT Pub. No.: WO2009/016240
PCT Pub. Date: Feb. 5, 2009

(65) Prior Publication Data
US 2010/0199764 A1    Aug. 12, 2010

(30) Foreign Application Priority Data
Jul. 31, 2007  (DE) .......................... 10 2007 035 806

(51) Int. Cl.
*G01P 15/00* (2006.01)
(52) U.S. Cl. ................................................. 73/504.12
(58) Field of Classification Search ............... 73/504.12, 73/488, 510, 514.12, 493, 514.01, 514.02
See application file for complete search history.

(56) References Cited

U.S. PATENT DOCUMENTS 4,782,700 A * 11/1988 Hulsing ...................... 73/504.12
4,811,602 A *  3/1989 Hulsing ...................... 73/504.04
(Continued)

FOREIGN PATENT DOCUMENTS
DE          19523895          1/1997
(Continued)

OTHER PUBLICATIONS

International Preliminary Report on Patentability for PCT/EP2008/060086, Oct. 14, 2010, 13 pages.

*Primary Examiner* — Peter Macchiarolo
*Assistant Examiner* — Samir M Shah
(74) *Attorney, Agent, or Firm* — North Weber & Baugh LLP

(57) ABSTRACT

A micromechanical rate-of-rotation sensor for detecting a rate of rotation about a sense axis includes a substrate, a detection unit, means for generating a rotational oscillation of the detection unit about a drive axis which is orthogonal to the sense axis, and a central suspension means rotatably coupling the detection unit to the substrate in a fulcrum of the detection unit. The central suspension means is configured to permit the detection unit to perform a detection movement about a detection axis orthogonal to the sense axis in the form of a rotational oscillation about the central suspension means. The sensor also includes at least two second suspension means coupling the detection unit and the substrate for providing a response behavior specific to rotation about at least one of the drive axis and the detection axis.

19 Claims, 8 Drawing Sheets

U.S. PATENT DOCUMENTS

| | | | |
|---|---|---|---|
| 4,848,156 A * | 7/1989 | Hulsing | 73/504.04 |
| 4,864,861 A * | 9/1989 | Hulsing | 73/504.12 |
| 5,025,346 A * | 6/1991 | Tang et al. | 361/283.1 |
| 5,203,208 A * | 4/1993 | Bernstein | 73/504.12 |
| 5,241,861 A * | 9/1993 | Hulsing, II | 73/514.02 |
| 5,249,465 A * | 10/1993 | Bennett et al. | 73/510 |
| 5,313,835 A * | 5/1994 | Dunn | 73/514.15 |
| 5,331,853 A * | 7/1994 | Hulsing, II | 73/514.29 |
| 5,341,682 A * | 8/1994 | Hulsing, II | 73/504.04 |
| 5,349,855 A * | 9/1994 | Bernstein et al. | 73/504.16 |
| 5,377,544 A * | 1/1995 | Dunn | 73/504.08 |
| 5,396,797 A * | 3/1995 | Hulsing, II | 73/504.04 |
| 5,869,760 A * | 2/1999 | Geen | 73/504.12 |
| 6,062,082 A * | 5/2000 | Guenther et al. | 73/514.16 |
| 6,094,985 A | 8/2000 | Kapels et al. | |
| 6,250,157 B1 * | 6/2001 | Touge | 73/504.12 |
| 6,315,062 B1 * | 11/2001 | Alft et al. | 175/45 |
| 6,484,818 B2 * | 11/2002 | Alft et al. | 175/45 |
| 6,510,745 B2 * | 1/2003 | Geen | 73/861.356 |
| 6,516,651 B1 * | 2/2003 | Geen | 73/1.16 |
| 6,561,028 B1 | 5/2003 | Aigner et al. | |
| 6,719,069 B2 * | 4/2004 | Alft et al. | 175/24 |
| 6,845,665 B2 * | 1/2005 | Geen | 73/504.04 |
| 6,848,304 B2 * | 2/2005 | Geen | 73/504.04 |
| 7,143,844 B2 * | 12/2006 | Alft et al. | 175/45 |
| 7,222,533 B2 * | 5/2007 | Mao et al. | 73/504.04 |
| 7,228,738 B2 * | 6/2007 | Acar et al. | 73/504.04 |
| 7,240,552 B2 * | 7/2007 | Acar et al. | 73/504.12 |
| 7,591,179 B2 | 9/2009 | Krieg et al. | |
| 7,607,494 B2 * | 10/2009 | Alft et al. | 175/45 |
| 7,675,217 B2 * | 3/2010 | Delevoye et al. | 310/309 |
| 7,845,228 B2 * | 12/2010 | Bremer et al. | 73/510 |
| 7,950,281 B2 * | 5/2011 | Hammerschmidt | 73/504.04 |
| 2010/0083756 A1 * | 4/2010 | Merz et al. | 73/504.12 |

FOREIGN PATENT DOCUMENTS

| | | |
|---|---|---|
| DE | 19641284 | 5/1998 |
| DE | 19928307 | 12/1999 |
| DE | 19844686 | 4/2000 |
| DE | 19915257 | 6/2000 |
| WO | 00/29855 | 5/2000 |
| WO | 01/79862 | 10/2001 |
| WO | 2008122502 | 10/2008 |

* cited by examiner

MICROMECHANICAL RATE-OF-ROTATION SENSOR

RELATED APPLICATIONS

This is a national phase application under 35 U.S.C. §371 of co-pending International Application No. PCT/EP2008/060086 filed Jul. 31, 2008, which claims priority under 35 U.S.C. §119(a) to German Patent Application No. 10 2007 035 806.9 filed on Jul. 31, 2007, the entire contents of all of which are incorporated herein by reference.

BACKGROUND OF THE INVENTION

Micromechanical rate-of-rotation sensors are known from the prior art, wherein it may, in general, be distinguished between decoupled and coupled sensors. In decoupled sensors, the vibrating structure comprises a drive means and a detection element which is mechanically separate therefrom. The drive means is brought into a usually stationary state of movement, i.e. the drive oscillation. Spreading of the drive oscillation to the detection element is prevented by a suitable arrangement of spring elements coupling the drive element to the detection element. If a rate of rotation acts upon the sensor from outside, the drive element is excited to a further movement, i.e. the detection movement, besides the drive oscillation. In further consequence, said movement is transferred to the detection element via the spring elements, monitored and evaluated.

In coupled sensors, the vibrating structure has the function of both, a drive element and a detection element. Said vibrating structure may be realized both in one piece and a number of pieces, is excited to a drive oscillation and also carries out the detection movement, besides the drive oscillation, when an external rate of rotation acts upon it.

Coupled micromechanical movement sensors comprising a wing-shaped detection unit are known from DE 103 20 725 A1 and DE 199 15 257 A1. Said detection unit is centrally mounted on a substrate. The central mounting is carried out by means of a number of radially distributed suspension beams, each being aligned transversely to the tilting direction to be detected, which suspension beams are mounted to one central point or a number of decentralized points on the substrate.

Due to an excitation generated internally in the sensor, the detection unit performs a rotational oscillation, as the drive movement, in parallel with the substrate and about a center of rotation coinciding with the central mounting. As a result of an external rate of rotation acting upon the sensor (in the direction of or about the sense axis) and Coriolis forces generated thereby, the detection unit experiences a change in angular momentum resulting in a tilting movement thereof about an axis (detection axis) perpendicular to the axis of rotational oscillation/drive axis and to the exterior rate of rotation. The tilting movement is detected by means of a capacitive sensor arrangement which is formed by the detection unit, on the one hand, and capacities located opposite said detection unit on the substrate, on the other hand. The sensor arrangement is realized by a plurality of capacities arranged in a distributed manner in order to enable detection depending upon the direction of the rate of rotation.

For adjusting sensitivity of the response behavior in various directions, DE 199 15 257 A1 discloses suitable dimensioning of the aspect ratio of the suspension springs or beams of the detection unit. By purposefully realizing the aspect ratio of suspension beams arranged in specific directions in space, for example, rotational oscillation (drive oscillation) of the detection unit about the drive axis and tilting about a detection axis perpendicular to the drive axis may be enabled, whereas tilting about a sense axis perpendicular to said axes may be substantially prevented or restricted in a desired manner.

Even though detection of rates of rotation in a manner specific to the direction of the rate of rotation is possible in this way, sensors known from the described prior art are susceptible to the influence of external disturbances, such as shock acceleration or vibrations, and often not robust enough due to their central suspension. Thus, pronounced relative changes in position between detection unit and substrate may occur, which may in turn result in a so-called sticking and uselessness of the sensor.

SUMMARY OF THE INVENTION

The present invention provides, in one aspect, a micromechanical Coriolis rate-of-rotation sensor with a response behavior which can be realized in a manner specific to the axis of rotation and with sufficient sensitivity to rates of rotation in one or more directions, which sensor simultaneously has sufficient robustness with respect to the effect of external shock or vibration in the measuring direction or directions (about a detection axis) in order to meet the requirements of electronic signal processing as far as possible and, in particular, to counteract the risk of the vibrating structure sticking to the substrate.

The present invention provides, in another aspect, a micromechanical Coriolis rate-of-rotation sensor for detecting a rate of rotation about a sense axis which is referred to as the X axis in the following. Said sensor comprises a substrate, a vibrating structure and means for generating a rotational oscillation about an drive axis (Z axis) which is orthogonal to the sense axis. The vibrating structure is rotatably connected to the substrate by means of first inner suspension means or by means of a central suspension means, so as to perform rotational oscillations about a fulcrum or center of rotation relative to the substrate.

The present invention provides, in yet another aspect, a micromechanical rate-of-rotation sensor for detecting a rate of rotation about a sense axis includes a substrate, a detection unit, means for generating a rotational oscillation of the detection unit about a drive axis which is orthogonal to the sense axis, and a central suspension means rotatably coupling the detection unit to the substrate in a fulcrum of the detection unit. The central suspension means is configured to permit the detection unit to perform a detection movement about a detection axis orthogonal to the sense axis in the form of a rotational oscillation about the central suspension means. The sensor also includes at least two second suspension means coupling the detection unit and the substrate for providing a response behavior specific to rotation about at least one of the drive axis and the detection axis.

Robustness to disturbing mechanical influences may, in general, be achieved by raising the resonance frequencies of the movable sensor structure to values largely outside the acoustic spectrum, thereby making the sensor less sensitive to shock and vibrations. However, such a measure will, in general, entail a reduction of the moment of inertia of the detection element and thus a decrease of the detecting sensor surface so that the enhanced robustness will be obtained at the cost of lower sensor sensitivity. A main aspect thus resides in creating a sensor design which is characterized by insensitivity to disturbing mechanical influences as high as possible and which simultaneously accomplishes or possibly exceeds the sensitivity of other designs corresponding the current prior art.

To address this issue, the micromechanical Coriolis rate-of-rotation sensor of the invention includes at least one pair of second suspension means connecting the vibrating structure to the substrate and arranged on opposite sides of the fulcrum of the vibrating structure (or the center of rotation), wherein the at least one pair of second suspension means is arranged at a greater radial distance from the fulcrum (or the center of rotation) than the first inner suspension means or the central suspension means.

For describing the rate-of-rotation sensor according to the invention, a Cartesian coordinate reference system which is stationary with respect to the sensor substrate is used by way of example in the following. The point of origin of said system coincides with the fulcrum (or the center of rotation) of the vibrating structure arranged on the substrate. Its orientation to the sensor is merely exemplary and not limited to the provided illustration. The X axis and the Y axis of the reference system are arranged in parallel with the substrate plane in the plane of the static (not carrying out the detection movement) vibrating structure. The Z axis as the drive axis extends orthogonally to the substrate plane so that the vibrating structure is excited to carry out a rotational oscillation about the Z axis (drive movement). The rate of rotation to be measured (as a pseudo-vectorial angular speed) is located in the X-Y plane, e.g. in parallel with the X axis which, in this case, represents the axis of rotation or sense axis of the sensor. The measuring movement then consists in a tilting oscillation of the vibrating structure about the Y axis which, in this case, is the detection axis. In the case of a sensor not restricted to the measuring direction, the X and Y axes each act as both, the sense axis and detection axis. In case of a rate of rotation not oriented in parallel with the Y or X axis, the acceleration portions thereof each act in the direction of one of said axes and result in deflection movements about the respective other axis so that the X and the Y axes may simultaneously be both, the sense axis and detection axis.

The present invention relates to both, coupled and decoupled rate-of-rotation sensors; however, it may be employed in coupled sensors in a particularly advantageous manner. In the case of coupled sensors, the vibrating structure acts as the detection unit and carries out both, excitation and detection movements. In the case of a decoupled sensor, the vibrating structure usually comprises both, a detection unit and an excitation unit, wherein the excitation unit is excited to carry out the excitation movement and the detection unit carries out the detection movement to be determined.

In both afore-mentioned cases, the vibrating structure is coupled to the substrate via the first inner suspension means or the central suspension means and via at least one pair of second outer suspension means according to the invention, wherein the at least one pair of second suspension means is arranged at a greater radial distance from the fulcrum or the center of rotation than the first inner suspension means. In case a central suspension means is used instead of first inner suspension means, the greater radial distance from the fulcrum or the center of rotation inevitably arises, since the central suspension means is arranged in the fulcrum, thus having a radial distance to the fulcrum close to zero.

In the case of a coupled sensor, this means that the detection unit forming the vibrating structure is coupled to the substrate via the first inner suspension means or the central suspension means and the second outer suspension means. In the case of a decoupled sensor, this may equally apply with respect to the detection unit, however, the excitation unit which, together with detection unit, forms the vibrating structure in the case of a decoupled sensor, as already described above, may alternatively or additionally be connected to the substrate by means of said first inner suspension means or the central suspension means and the second outer suspension means.

Both, the first inner suspension means and the central suspension means as well as the second outer suspension means, may each be connected directly to the substrate via one or a number of points of suspension or may be coupled indirectly to the substrate via suspension structures or elements (pins, beams, etc.). Points of suspension, structures or elements are referred to as coupling structures in the following. The vibrating structure is elastically connected to the coupling structure which enables the afore-mentioned movements of the vibrating structure relative to the substrate.

The first inner suspension means or the central suspension means and the second outer suspension means may be, on principle, arbitrarily designed. What is essential is that the first inner suspension means or the central suspension means enable the drive movement (rotational oscillation about the Z axis) and simultaneously enable the detection movement(s) (tilting about the X and/or Y axis). They may be designed such that the drive movement is possible in a first direction only and the detection movement is possible in a further direction only (sensor having only one measuring direction). This is preferably achieved by an axially symmetric design or arrangement of the first inner suspension means, for example by arranging said inner suspension means in pairs opposite each other on both sides of the fulcrum. However, detection movements are also possible in two directions in space, e.g. by arranging the first inner suspension means point symmetrically to the fulcrum and as close to the fulcrum as possible with respect to said directions or by using a central suspension means. The sensor then has a response behavior which is independent of direction or non-specific to the axis of rotation. Without further second outer suspension means, the effect of a rate of rotation of a specific magnitude, irrespective of its direction of rotation relative to the sensor, would always bring about a detection movement of corresponding identical magnitude. The direction of deflection of the vibrating structure would then be dependent on the orientation of the rate of rotation to the sensor only.

The second outer suspension means, irrespective of the specific design of the first inner suspension means or the central suspension means, serve the purpose of realizing the response behavior and the measurement sensitivity of the sensor in a manner specific to the axis of rotation and in a simple manner from a manufacturing point of view. The second outer suspension means preferably do not influence the drive movement of the vibrating structure or only to an insignificant amount. The effect of the second outer suspension means is preferably restricted to the detection movement(s) in the sense direction or directions. By correspondingly adjusting the number and design of the second outer suspension means and/or the positioning thereof with respect to the fulcrum, the relative mobility between vibrating structure and substrate may be individually adjusted with respect to direction. Thereby, the measurement sensitivity of the sensor is realized in a manner specific to direction so that said sensor will have a response behavior which is specific to the axis of rotation. Furthermore, the resonance frequency of the sensor may be realized in a manner specific to direction, i.e. increased or decreased, without requiring a change, e.g. decrease, of the moment of inertia of the vibrating structure along with a decrease in sensitivity resulting therefrom. For example, the resonance frequencies of the vibrating structure upon movements about the Z axis and the Y axis may be influenced in a controlled manner by means of the arrangement of the second outer suspension means, whereas movement about the X axis is largely restricted by means of the arrangement of the inner suspension means, thereby reducing the number of the degrees of freedom to two. By corresponding dimensioning, both the operating frequencies and the parasitic resonances of the vibrating structure may be influenced without involving a substantial loss of sensitivity, which makes the sensor insensible to disturbing mechanical influences, in particular in the sense direction, while having sufficient sensitivity.

The second suspension means are preferably located diametrically opposite each other on straight lines extending through the center of gravity of the vibrating structure 2. In the case of a pair of second suspension means, this straight line is preferably congruent with one of the axes of the reference system which is stationary with respect to the sensor. It is also possible that more than one pair of second suspension means is used, which are preferably arranged symmetrically with respect to the X axis and symmetrically with respect to the Y axis. The second suspension means are, in general, not connected to each other (by means of bars or the like), but have a direct elastic connection to the substrate each. Moreover, it is of particular advantage if they are arranged independently of each other in individual recesses within the vibrating structure and symmetric with respect to the specified rotation center. However, an arrangement in the outer region of the vibrating structure is possible as well. Second outer suspension means arranged within the surface of the vibrating structure are preferably associated with a recess in the vibrating structure accommodating the respective suspension means with sufficient tolerance so that functional rotational oscillation of the sensor structure is not impeded. The rotation center of the vibrating structure preferably coincides with the center of gravity thereof.

According to a further proposal of invention, each first inner or second outer suspension means comprises at least one spring element, preferably a beam spring element or a bending beam, which is attached to the vibrating structure, on the one hand, and directly to the substrate or a coupling structure rigidly connected to the substrate, on the other hand. According to a further proposal, the spring elements of the first inner and/or second outer suspension means are branched in an area of a connecting portion, connecting the spring elements to the vibrating structure and to the substrate or to the coupling structures thereof and, in particular, form a number of arms. The connecting portion is preferably rounded and may be, in particular, elliptical. In this way, the connecting portions of the spring elements are formed as large as possible thereby minimizing internal tension. Furthermore, only a small amount of material is required due to the branching so that a high load capacitance is achieved at a weight as light as possible. Preferably, the ends of spring elements remote from the rotation center of the vibrating structure are connected to the vibrating structure, whereas the opposite ends of the spring elements which are thus located further inwards are connected to the substrate or the coupling structure thereof.

In order to prevent any change in sensor characteristic as a result of the triple or multiple fixing of the detection unit or vibrating structure to the substrate, for example, due to temperature-related deformations, it is contemplated, in accordance with a particularly advantageous embodiment of the invention, that each of the spring elements of the second suspension means is provided with a compensating deformation portion in their longitudinal direction. Without such portions, distortions or deformations of the substrate and/or the detection unit or vibrating structure might alter the positions of the fixing points of the spring elements relative to the first inner suspension means so that a change in spring characteristic might occur and/or the rest position of the detection unit or vibrating structure relative to the substrate might be changed, thereby adversely influencing the temperature response of the sensor. By the deformation compensating portions compensating deformations in the longitudinal direction of the spring elements, tensions introduced into the spring elements by a relative displacement of the fixing points are reduced or even completely neutralized. The portions act as buffer elements cushioning or absorbing tensions. It has been found that it is particularly advantageous if said portions of the spring elements are designed meander-shaped, U-shaped, C-shaped or annular, wherein other designs enabling reduction of tension caused by relative displacements of the fixing points apart from the afore-said are also possible. By use of such portions, changes in the resonance frequencies of the sensor caused by relative displacements can be reduced by a factor of 10 as compared to a mere beam spring.

According to a preferred embodiment, the vibrating structure is comprised of a substantially rigid plate which, in the case of a coupled sensor, combines the function of both, the drive element and the detection element. In a specific embodiment, the vibrating structure preferably comprises two wing-like protruding portions or shapes. Said portions or shapes serve the purpose of increasing sensitivity of the sensor when detecting a rate of rotation. If, for example, rotation of sensor about the X axis of an inertial system is to be detected, which is arranged axially in parallel with the stationary sensor system at a given time, the wing-like portions are realized in the direction of the X axis, preferably on both side of the Y axis.

According to a further embodiment, radially outwards directed combs or cogged beams are located at the vibrating structure, at which beams electrodes are seated or which beams form electrodes which, together with further stationary combs or cogged beams, form capacities. Said capacities are supplied with an electric alternating voltage of suitable frequency, thereby exciting the rotational drive oscillation of the vibrating structure about the Z axis. If a rate of rotation having a portion in parallel with the X axis is applied, then the detection movement is excited, as explained above. In doing so, the vibrating structure describes a tilting oscillation about the Y axis of the reference system, which oscillation is capacitively detected by electrodes formed by the vibrating structure itself and parts of the underlying substrate. The spatial distance of the fixing points from the fulcrum is an essential design parameter: The effects of the moments of inertia of the vibrating structure which are high due to the wing-like protruding portions—in the present example about the Y and Z axes of the sensor reference system—such as low resonance frequencies of the oscillations about said axes, may be compensated by the externally arranged second suspension means in a controlled manner. Moreover, the suspension means arranged away from the rotation center in the outward direction counteract too large deflections of the movable sensor structure, in particular, in case of non-negligible elastic deformations of the vibrating structure. In this way, a possible tendency to adhesive sticking of the vibrating structure to the substrate is counteracted as well.

A particularly compact and robust embodiment of the sensor is provided, if the spring elements of the second suspension means are arranged in recesses in the wing-like protruding portions according to a further proposal of the invention. It is preferred that the end of the spring elements remote from the first inner suspension means is connected to the vibrating structure, whereas the opposite end is connected to the substrate. Such a sensor has high sensitivity for detection of rates of rotation about an axis of rotation or sense axis, while excessive deflection of the vibrating structure about the detection axis is prevented by the spring elements. Simultaneously, the resonance frequencies of the system may be increased, upon deflection of the vibrating structure about the detection axis relative to the substrate, to values outside the acoustic spectrum, however, at least to a value of more than 10 kHz, thereby rendering the sensor substantially less sensitive to undesired disturbing environmental influences which, in most cases, are within the acoustic region, such as shock or vibration. In addition, striking of the vibrating structure in measuring mode caused by the effect of external shock, with all negative consequences associated therewith, is counteracted.

BRIEF DESCRIPTION OF THE DRAWINGS

Further advantages and embodiments of the present invention will be apparent from the following, non-limiting description of a preferred embodiment with reference to the Figures, in which.

DETAILED DESCRIPTION

Figure 1:
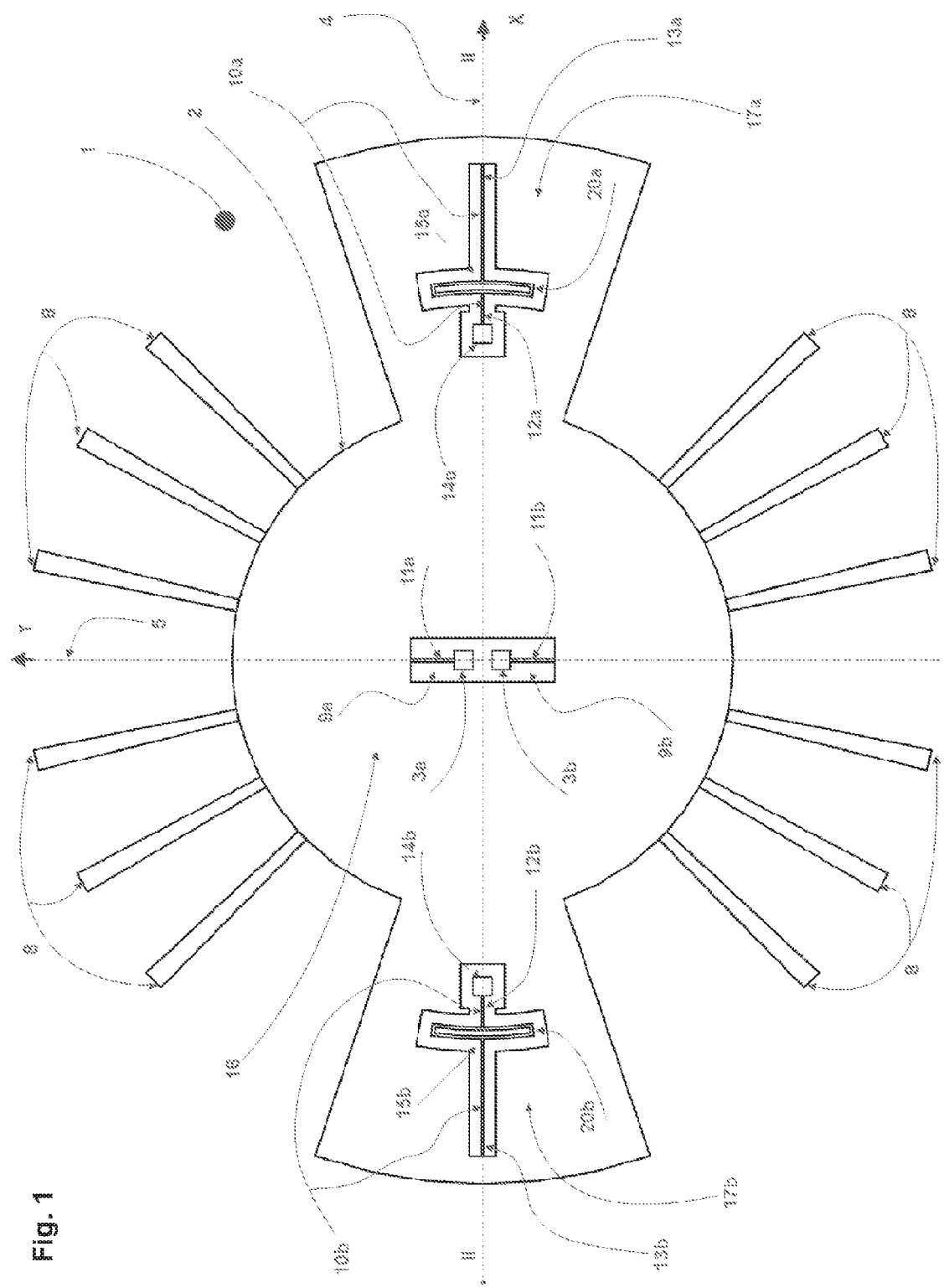
FIG. 1 shows a schematic plan view of a first preferred embodiment of the sensor comprising a pair of first inner suspension means.

In the following description of the embodiments and in the Figures, like elements and functional units of the sensors are indicated by like reference numerals and designations. The Cartesian coordinate system outlined in the Figures illustrates the sensor reference system indicated in the general description of the invention. The Z axis (6 in FIGS. 2 and 6) of said reference system extends perpendicularly out of the plane of the drawing towards the observer. The precise position of the point of origin is apparent from a synopsis of FIGS. 1 and 2 or 5 and 6. The X axis 4 will be referred to as the sense axis 4, the Y axis 5 will be referred to as the detection axis 5 and the Z axis 6 will be referred to as the drive axis 6 in the following.

Figure 2:
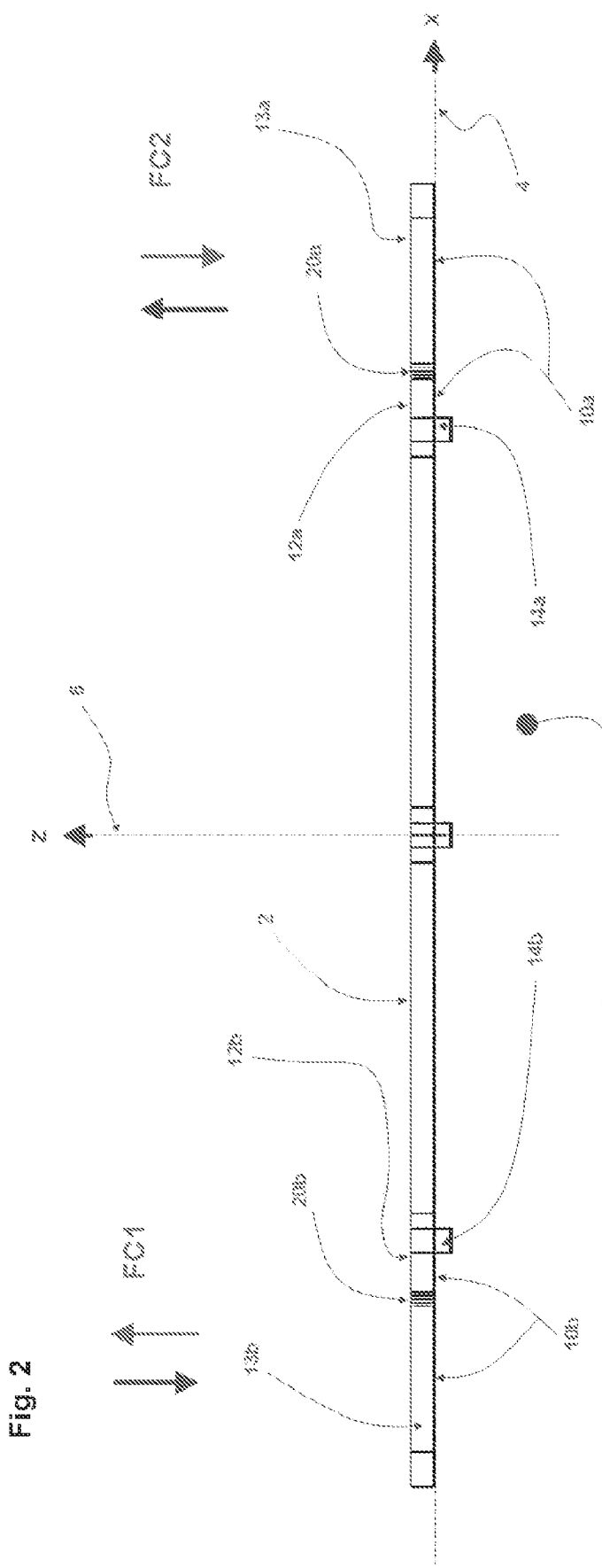
FIG. 2 shows a schematic sectional view along line II-II of FIG. 1.

The sensor according to a first embodiment illustrated in FIG. 1 in plan view comprises a substrate 1 as a basic element as is sufficiently known from the prior art. A vibrating structure 2 is mounted relative to the substrate 1 at opposite points of suspension arranged in pairs and having the form of mounting pins 3a, 3b, 14a, 14b as the coupling structures. The mounting pins 3a, 3b, together with spring elements 11a, 11b, form first inner suspension means 3a, 3b, 11a, 11b along the Y axis 5, whereas the mounting pins 14a, 14b, together with the spring elements 10a, 10b, form second outer suspension means 14a, 14b, 10a, 10b along the X axis 4. The spring elements 10a, 10b, 11a, 11b connect the vibrating structure 2 to the mounting pins 3a, 3b, 14a, 14b.

The vibrating structure 2 is mirror-symmetric to both, the detection axis 5 and the sense axis 4. Furthermore, it is point symmetric to the rotation center of the vibrating structure 2, which coincides with the point of origin of the coordinate system. The vibrating structure has a substantially circular base body 16, at which body wing-like protruding portions, which are referred to as wings 17a, 17b in the following, are arranged laterally in the direction of the sense axis 4. Schematically outlined drive combs 8 are arranged between the wings 17a, 17b on both sides of the base body 16 of the vibrating structure 2, via which combs the vibrating structure is rotationally oscillated about the drive axis.

Figure 3:
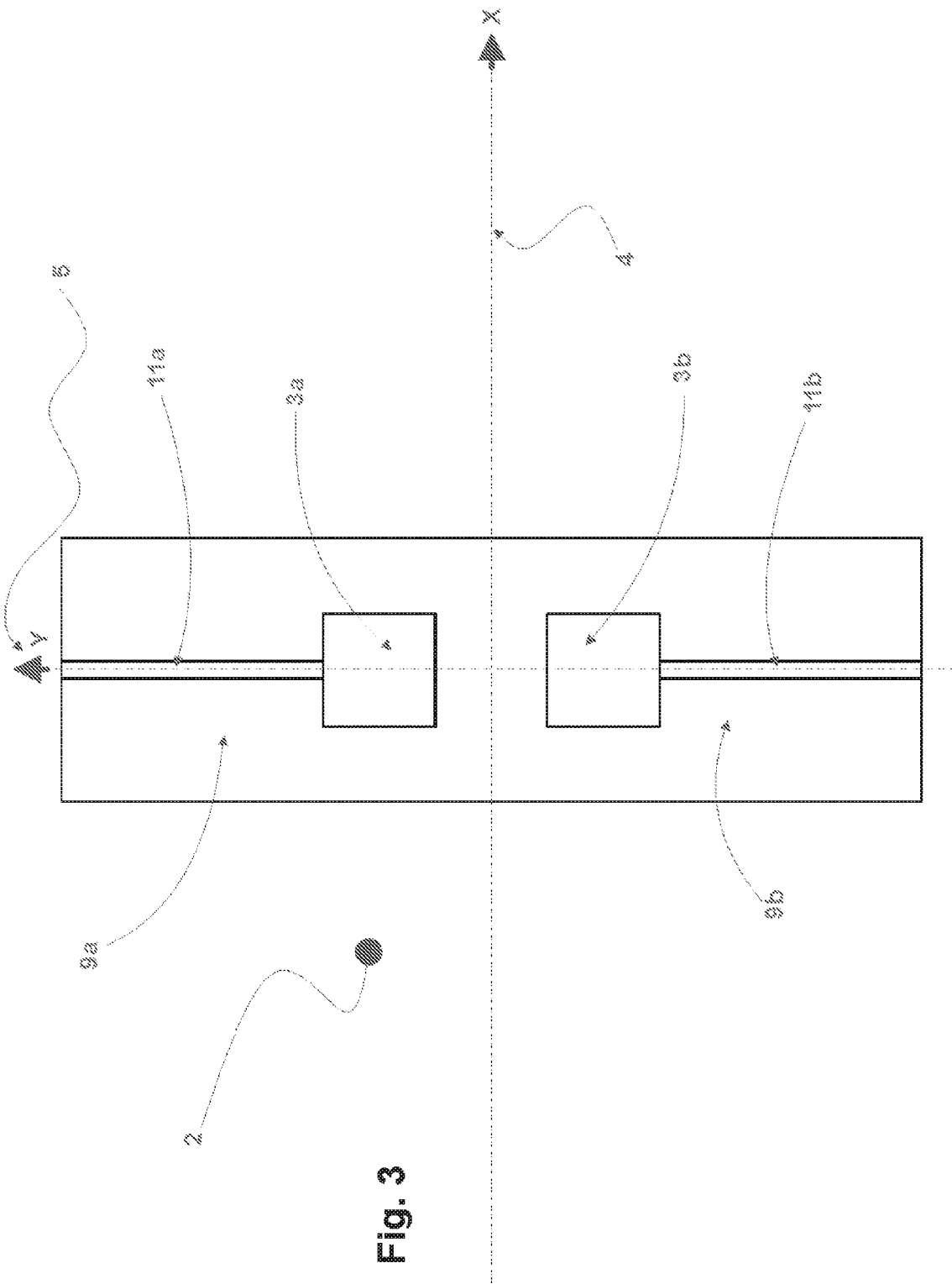
FIG. 3 shows an enlarged plan view of the first inner suspension means of the sensor of FIG. 1 arranged along the Y axis.

FIG. 3 shows an enlarged view of the mounting pins 3a, 3b, along with the springs 11a, 11b fixed thereto, arranged along the detection axis 5. The mounting pins 3a, 3b are firmly connected to the underlying substrate 1 and rise from the substrate in the direction of the positive drive axis 6. Recesses 9a, 9b are provided in the vibrating structure 2 for each suspension means 3a, 11a and 3b, 11b consisting of a spring element 11a, 11b and a mounting pin 3a, 3b. The spring elements 11a, 11b are connected to vibrating structure 2 at their ends opposite the mounting pins 3a, 3b. Due to their shape, the spring elements 11a, 11b permit rotational oscillation of the vibrating structure 2 relative to the substrate 1 about the drive axis 6 (drive movement) and rotational oscillation of the vibrating structure 2 relative to the substrate 1 about the detection axis 5 (detection movement), whereas rotational oscillation about the sense axis 4 of the vibrating structure 2 relative to the substrate 1 is suppressed or substantially prevented.

During operation, the vibrating structure 2 is rotationally oscillated relative to the substrate 1 about the drive axis 6 by means of the drive combs 8. If the entire sensor is now rotated about the sense axis 4, additional periodic couples of Coriolis forces arise which are symbolized by $F_{C1}$ and $F_{C2}$ in FIG. 2. Said forces act on the entire movable sensor structure 2, which forces are strongest in region of the wings 17a, 17b in the plane formed by the drive axis 6 and the sense axis 4. The Coriolis moment associated with the couples of Coriolis forces thus excites the measuring-mode rotational oscillation of the vibrating structure 2 about the detection axis 5. The relative change in position of the vibrating structure 2 relative to the substrate 1 associated therewith can be monitored by means of measuring electrodes not shown in the Figures which are preferably located in the region below the wings 17a, 17b and, if appropriate, partially or fully below the inner discus-shaped disk.

Figure 4:
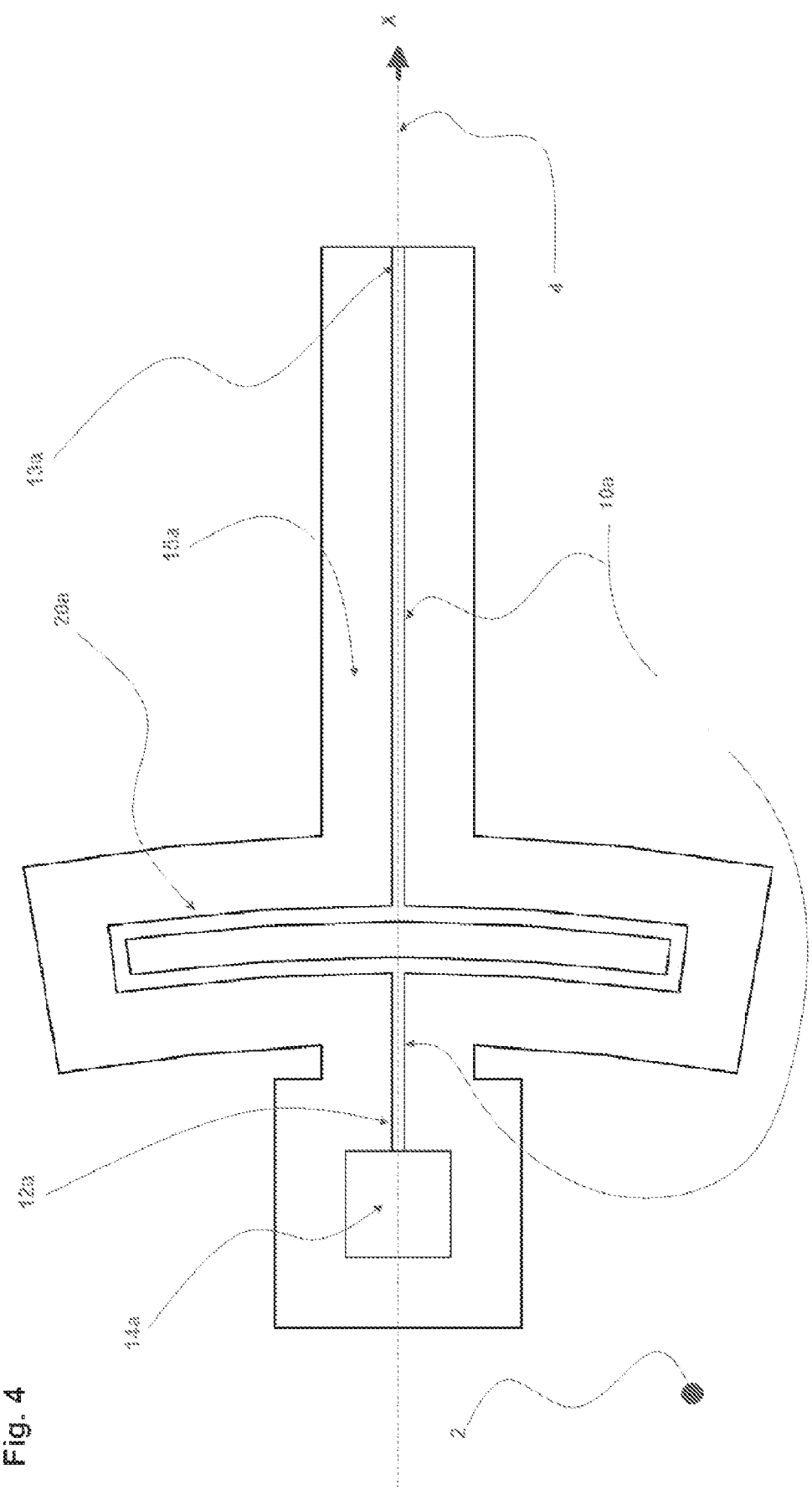
FIG. 4 shows an enlarged plan view of a spring element of the sensor of FIG. 1 comprising a point of suspension and a meander-shaped buffer zone, which spring element is arranged along the X axis within the right wing.

In addition to the connection via the suspension means 3a, 3b, 11a, 11b, the vibrating structure 2 is connected to the substrate 1 by means of two further outer suspension means, which are each comprised of mounting pins 14a, 14b and horizontal springs 10a, 10b attached thereto and having C-shaped deformation compensating portions or buffer zones 20a, 20b, see FIG. 4. The horizontal springs 10a, 10b are arranged within the region of the wings 17a, 17b of the vibrating structure 2. The wings 17a, 17b each comprise individual recesses 15a, 15b for this purpose, in which the horizontal springs 10a, 10b, along with their buffer zones 20a, 20b and mounting pins 14a, 14b, are accommodated.

The horizontal springs 10a, 10b are preferably connected to vibrating structure 2 at their ends 13a, 13b opposite the mounting pins 14a, 14b, while being fixed to the mounting pins 14a, 14b at their other ends 12a, 12b. The mounting pins 14a, 14b, like the mounting pins 3a, 3b, are firmly connected to the substrate 1.

The horizontal springs 10a, 10b each have the form of a bending beam. The aspect ratio of the horizontal springs may be arbitrarily chosen, however, it is preferably high. In the embodiment shown, the horizontal springs 10a, 10b have a substantially square cross-section, the width being smaller in the direction of the detection axis 5 than the length in the direction of the drive axis 6.

The horizontal springs 10a, 10b and the mounting pins 14a, 14b positioned within the wings 17a, 17b above all serve the purpose of compensating the effects of the high moments of inertia of the vibrating structure 2 about the respective spatial axes. Two effects are achieved by this measure: 1) The mechanical (and functional as well as parasitic) natural frequencies of the moved sensor structure may be raised to high values, e.g. more than 10 kHz (more than 20 kHz if the springs are adequately dimensioned), so that external parasitic vibrations in the acoustic frequency range will then be coupled into measuring movement of the vibrating structure to a very small extent only; and 2) the horizontal springs together with their inner suspension means largely prevent striking, caused by external shock impulses, which is accompanied by an adhesive sticking of the detection unit 2 to the underlying substrate 1.

In the sensors of the embodiments, the horizontal springs 10a, 10b are not realized in form of continuous bending beams having a constant cross-section. Rather, they comprise a region 20a, 20b acting as a buffer in which tensions introduced into the spring in the longitudinal direction thereof—i.e. in the direction of the sense axis 4—may be relieved. In the shown preferred embodiments, this region 20a, 20b is realized in form of an approximately C-shaped cantilever extending on both sides of the longitudinal axis of the spring. If, for example, a relative change in position takes place between the mounting pins 14a, 14b due to stress-induced deformations of the substrate, said deformations can be compensated by means of an elastic deformation of the horizontal springs 10a, 10b in the regions 20a, 20b, without substantially altering the spring characteristic of the horizontal springs 10a, 10b when bending about the detection axis 5 and bending about the drive axis 6. By use of such buffer zones in the springs, changes in resonance frequencies caused by relative displacements of the fixing points can be reduced by a factor of 10 as compared to a sensor having straight beam springs. Due to the arrangement of the mounting pins 3a, 3b relatively close to each other in the preferred embodiment, such buffer zones are not required for the first inner suspension means.

Figure 5:
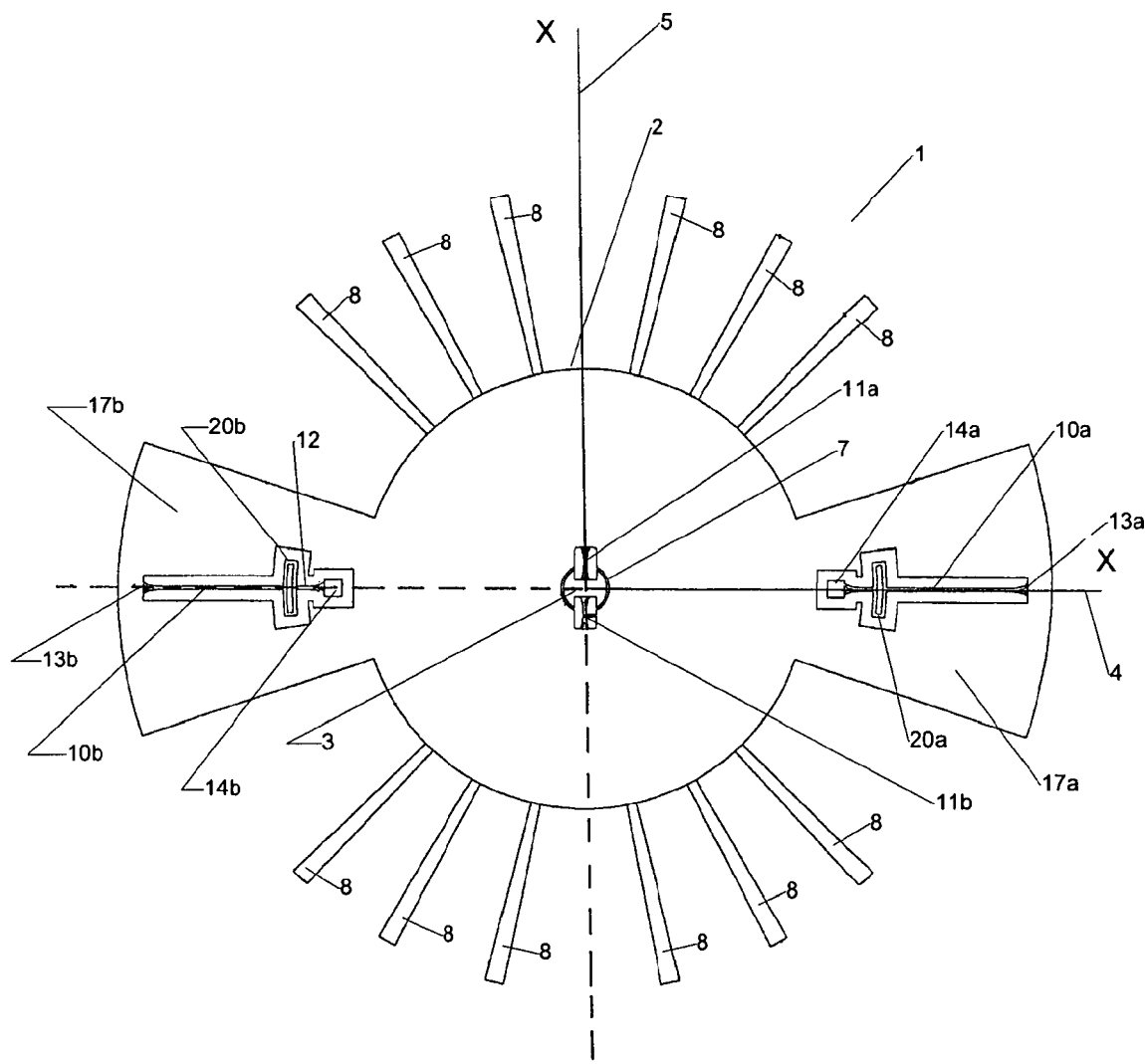
FIG. 5 shows a schematic plan view of a second preferred embodiment of the sensor comprising central suspension means.

FIG. 5 shows a second embodiment of the sensor in a schematic plan view, in which the vibrating structure 2 is mounted by means of central suspension means 3, 11a, 11b instead of the first inner suspension means 3a, 3b, 11a, 11b. The central suspension means coincides with the center of gravity of the vibrating structure 2 and is located at the point of origin of the coordinate system.

As in the first embodiment, the vibrating structure 2 is mirror symmetric to both, the detection axis 5 and the sense axis 4. Furthermore, it is point symmetric to the central suspension means 3, 11a, 11b. As for the rest, the vibrating structure is substantially identical to the vibrating structure 2 of the first embodiment, in which connection it is referred to the description thereof.

Figure 6:
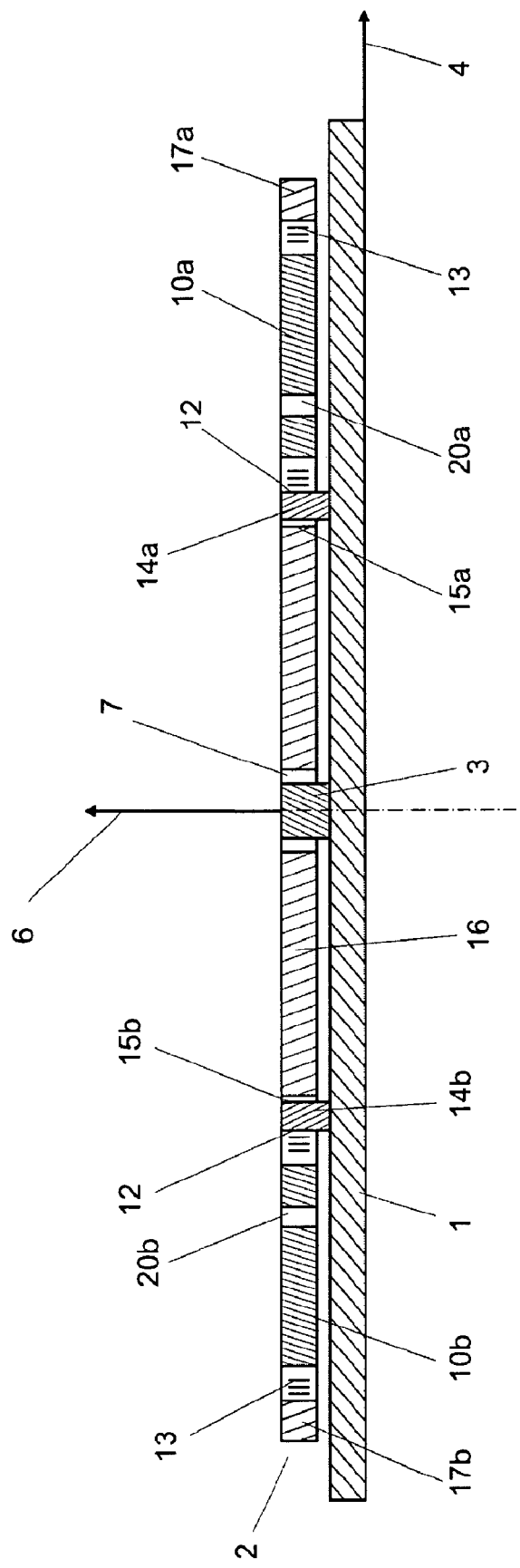
FIG. 6 shows a schematic sectional view along line VI-VI of FIG. 5.

FIG. 6 shows the central suspension means 3, 11a, 11b in an enlarged view. It is comprised of an armature 3 which is firmly connected to the substrate 1 and rises from the substrate 1 in the direction of the drive axis 6. The armature 3 has a substantially circular cross-section and is provided with recesses 18a, 18b located opposite each other in the direction of the detection axis 5. The vibrating structure 2 comprises a central through-hole 7. Said through-hole is also substantially circular and is provided with recesses 9a, 9b extending in the direction of the detection axis 5. The central through-hole 7 of the vibrating structure 2 has a larger diameter than the armature 3 so that the vibrating structure 2 is able to rotationally oscillate relative to the substrate 1 about the armature 3 in a largely unimpeded manner. The recesses 9a, 9b of the vibrating structure 2 and the recesses 18a, 18b of the armature 3 are located opposite each other. Armature springs 11a, 11b are arranged between said recesses and are each connected to the armature 3 at one end and connected to the vibrating structure 2 at the other end. Due to their shape, the armature springs 11a, 11b permit rotational oscillation of the vibrating structure 2 relative to the substrate 1 about the drive axis 6 and permit rotational oscillation of the vibrating structure 2 relative to the substrate 1 about the detection axis 5, whereas rotational oscillation of the vibrating structure 2 about the sense axis 4 relative to the substrate 1 is suppressed or substantially prevented.

Figure 7:
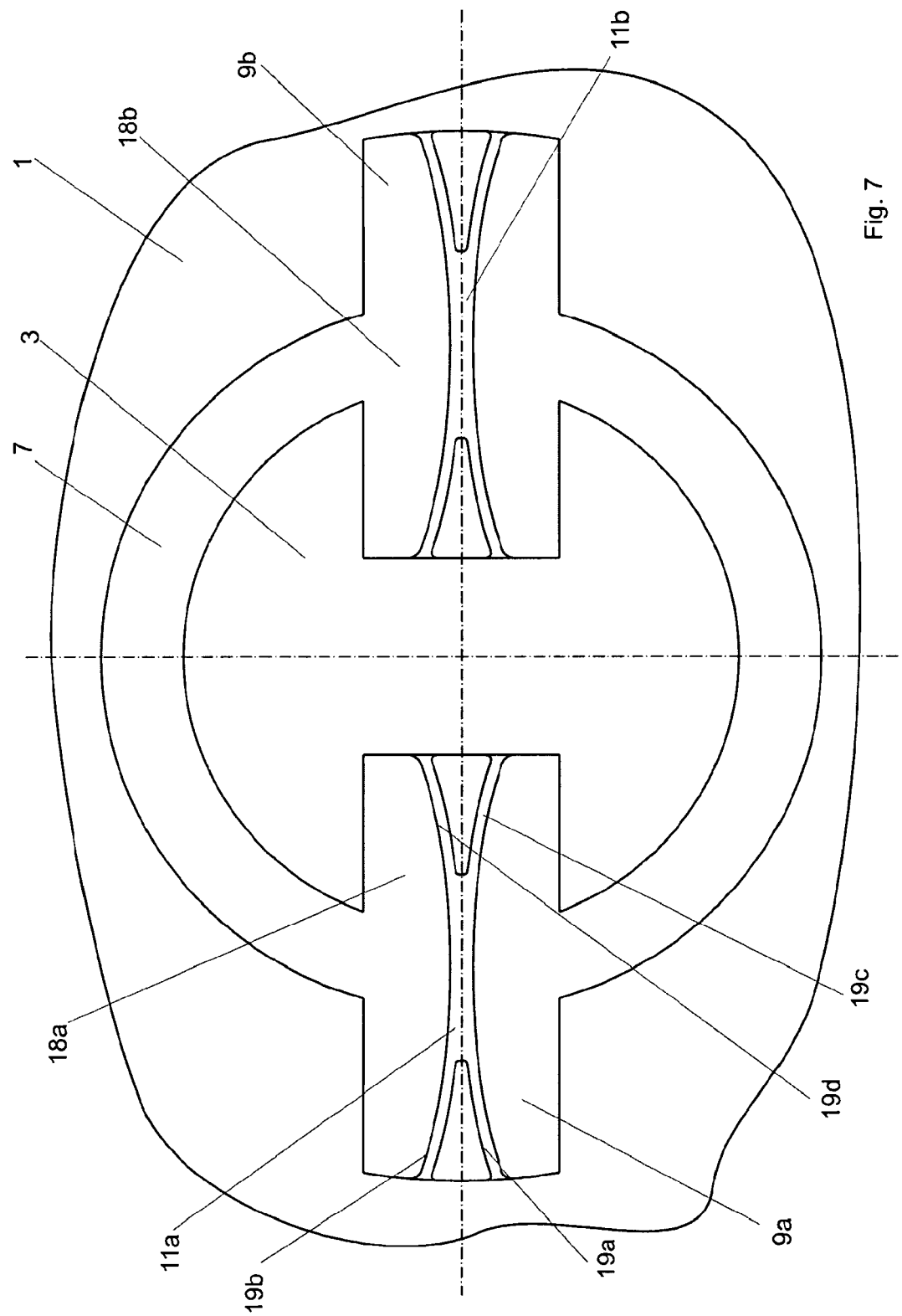
FIG. 7 shows an enlarged plan view of the central suspension means of the sensor of FIG. 5 arranged along the Y axis.
Figure 8:
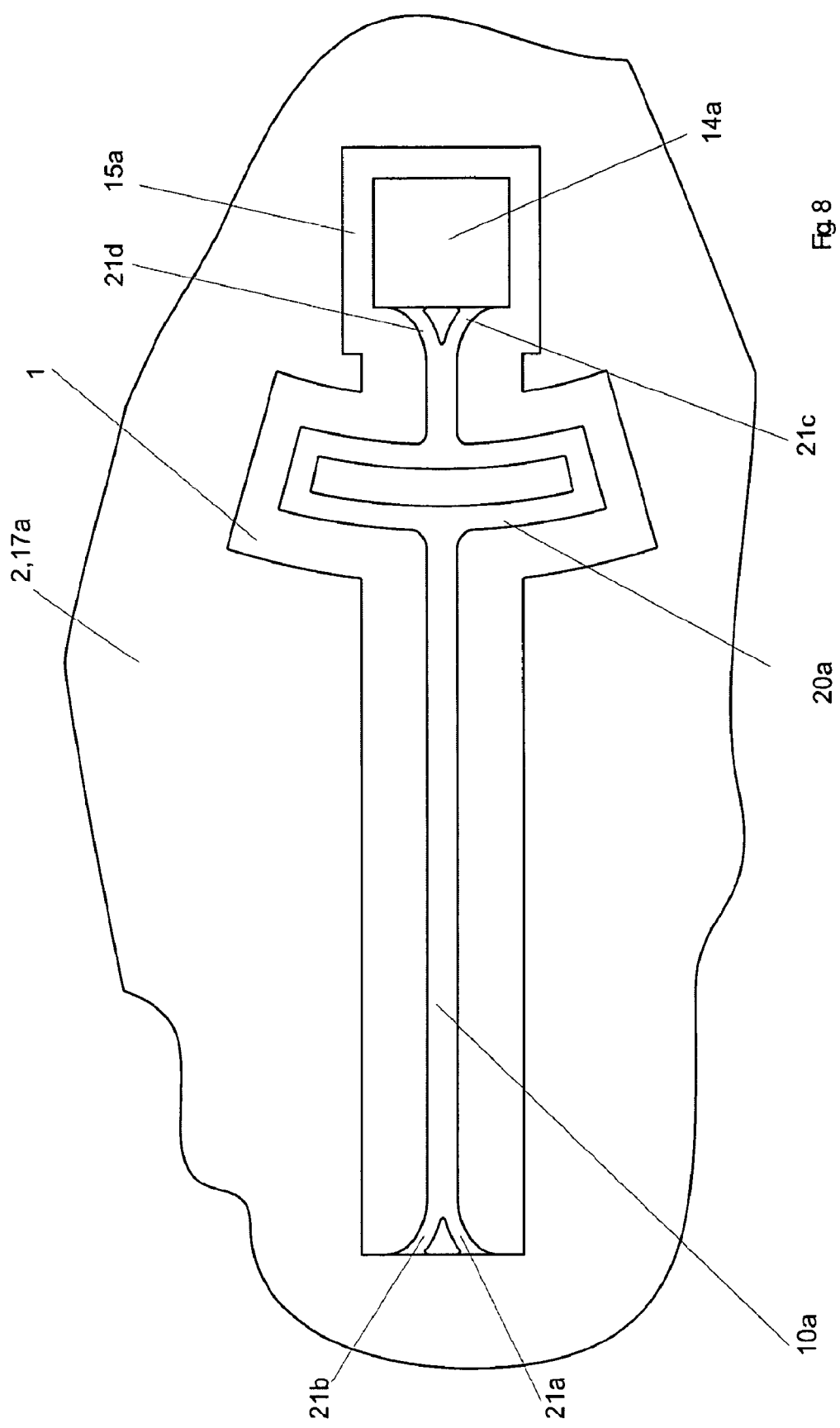
FIG. 8 shows an enlarged plan view of a spring element of the sensor of FIG. 5 arranged along the X axis within the right wing.

In the second embodiment, both the armature springs 11a, 11b and the horizontal springs 10a, 10b—as can be seen, in particular, in FIGS. 7 and 8—are provided with a branching 19a, 19b, 19c, 19d; 21a, 21b, 21c, 21d at the respective areas of spring attachment. Moreover, the areas of spring attachment, i.e. the end regions of the springs, are elliptically rounded. In this way, tensions present in the springs, in particular maximum tensions are distributed over a larger area in the regions of attachment, without simultaneously increasing rigidity of the springs too much. The points of attachment of the springs, in the respective adjacent regions of the detection unit 2 or central armature 3 or outer armature 14a, 14b, merge into each other in form of a rounded shape, which also results in a reduction of tension in the regions of spring attachment and in the structures adjacent thereto. All in all, this design of the spring end regions reduces the risk of fracture in said zones which results in improved durability of the entire sensor. This design of the regions of spring attachment may also be provided in a sensor according to the first embodiment.

What is claimed is:
1. A micromechanical rate-of-rotation sensor for detecting a rate of rotation about a sense axis, the sensor comprising:
   a substrate;
   a detection unit;
   means for generating a rotational oscillation of the detection unit about a drive axis which is orthogonal to the sense axis;
   a central suspension means rotatably coupling the detection unit to the substrate in a fulcrum of the detection unit, the central suspension means configured to permit the detection unit to perform a detection movement about a detection axis orthogonal to the sense axis in the form of a rotational oscillation about the central suspension means; and
   at least two second suspension means coupling the detection unit and the substrate, the at least two second suspension means being anchored on the substrate along the sense axis for providing a controlled response behavior specific to rotation about at least one of the drive axis and the detection axis.

2. The micromechanical rate-of-rotation sensor of claim 1, wherein the at least two second suspension means are arranged on opposite sides of the fulcrum.

3. The micromechanical rate-of-rotation sensor of claim 1, wherein the at least two second suspension means are located diametrically opposite each other on a straight line extending through the central suspension means.

4. The micromechanical rate-of-rotation sensor of claim 1, wherein each of the second suspension means includes a spring element.

5. The micromechanical rate-of-rotation sensor of claim 4, wherein the spring element is configured as a bending beam.

6. The micromechanical rate-of-rotation sensor of claim 4, wherein the spring element includes a deformation compensating portion configured to compensate deformations in the spring element in a longitudinal direction.

7. The micromechanical rate-of-rotation sensor of claim 6, wherein the deformation compensating portion is one of meander-shaped, U-shaped, C-shaped, and annular.

8. The micromechanical rate-of-rotation sensor of claim 4, wherein the rigidity of the spring element is higher in a direction of deflection caused by a rate of rotation to be detected than in a direction orthogonal thereto.

9. The micromechanical rate-of-rotation sensor of claim 4, wherein the spring element has a substantially square cross-sectional shape and a high aspect ratio.

10. The micromechanical rate-of-rotation sensor of claim 4, wherein the spring element is connected to the detection unit at a first end that is radially remote from the central suspension means.

11. The micromechanical rate-of-rotation sensor of claim 10, wherein the spring element is connected to the substrate at an opposite, second end via an outer armature.

12. The micromechanical rate-of-rotation sensor of claim 11, wherein at least one of the first and second ends of the spring element is branched.

13. The micromechanical rate-of-rotation sensor of claim 12, wherein at least one of the first and second ends of the spring element is one of rounded and elliptically rounded.

14. The micromechanical rate-of-rotation sensor of claim 1, wherein the central suspension means includes a bending spring which substantially prevents rotational movement of the detection unit relative to the substrate about the sense axis and permits rotational movement in other directions.

15. The micromechanical rate-of-rotation sensor of claim 1, wherein the detection unit includes two wing-like protruding portions.

16. The micromechanical rate-of-rotation sensor of claim 15, wherein each of the second suspension means includes a spring element and a deformation compensating portion configured to compensate deformations in the spring element in a longitudinal direction, and wherein each of the wing-like protruding portions includes a recess in which the spring element and the deformation compensating portion is coupled to the detection unit.

17. The micromechanical rate-of-rotation sensor of claim 1, wherein the detection unit includes drive combs arranged in a radial direction.

18. The micromechanical rate-of-rotation sensor of claim 1, wherein the central suspension means includes a central armature and at least two bending springs, wherein each bending spring includes a first end coupled to the central armature and a second end coupled to the detection unit, and wherein at least one of the first and second ends of the respective bending springs is branched.

19. The micromechanical rate-of-rotation sensor of claim 1, wherein the central suspension means includes a central armature and at least two bending springs, wherein each bending spring includes a first end coupled to the central armature and a second end coupled to the detection unit, and wherein at least one of the first and second ends of the respective bending springs is one of rounded and elliptically rounded.

* * * * *